US010819568B2

(12) United States Patent
Rondeau

(10) Patent No.: US 10,819,568 B2
(45) Date of Patent: Oct. 27, 2020

(54) SYSTEM AND METHOD FOR CONFIGURING THE ETHERNET NETWORK AND RF CONNECTIONS FOR LINKS BETWEEN NODES OF A DISTRIBUTED ANTENNA SYSTEM

(71) Applicant: CommScope Technologies LLC, Hickory, NC (US)

(72) Inventor: Michael N. Rondeau, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/007,789

(22) Filed: Jun. 13, 2018

(65) Prior Publication Data

US 2018/0375721 A1 Dec. 27, 2018

Related U.S. Application Data

(60) Provisional application No. 62/524,648, filed on Jun. 26, 2017.

(51) Int. Cl.
*H04L 12/24* (2006.01)
*H04L 29/12* (2006.01)

(52) U.S. Cl.
CPC ...... *H04L 41/0806* (2013.01); *H04L 61/2015* (2013.01); *H04L 61/103* (2013.01); *H04L 61/6022* (2013.01); *H04L 61/6068* (2013.01)

(58) Field of Classification Search
CPC ............ H04L 41/0806; H04L 61/2015; H04L 61/103; H04L 61/6022; H04L 61/6068
See application file for complete search history.

(56) References Cited

U.S. PATENT DOCUMENTS

| | | | |
|---|---|---|---|
| 6,501,746 B1 | 12/2002 | Leung | |
| 7,277,416 B1 | 10/2007 | Chang et al. | |
| 7,286,507 B1 * | 10/2007 | Oh | H04W 16/26 370/312 |

(Continued)

OTHER PUBLICATIONS

International Searching Authority, "International Search Report and Written Opinion from PCT Application No. PCT/US2018/037373 dated Nov. 15, 2018", from Foreign Counterpart to U.S. Appl. No. 16/007,789, filed Nov. 15, 2018, pp. 1-14, Published: WO.

*Primary Examiner* — Andrew Lai
*Assistant Examiner* — Harry H Kim
(74) *Attorney, Agent, or Firm* — Fogg & Powers LLC

(57) ABSTRACT

In one embodiment, a system comprises a master unit having communication ports and coupled to one or more base stations, and a second unit coupled to and located remotely from the master unit. The second unit has a communication port coupled to one of the communication ports of the master unit via a communication medium and communicates Ethernet and digitized RF data using the communication port. The second unit requests an IP address from the master unit, and the request includes a MAC address of the second unit. The master unit determines which communication port of the master unit received the request and assigns an IP address to the second unit based on which of the communication ports received the request and without using a DHCP server. The master unit sends the IP address to the second unit, wherein the second unit is configured for operation using the IP address.

47 Claims, 3 Drawing Sheets

(56) References Cited

U.S. PATENT DOCUMENTS

| | | | |
|---|---|---|---|
| 2003/0126262 A1* | 7/2003 | Yoshida | H04L 61/2015 709/226 |
| 2006/0268890 A1* | 11/2006 | Richardson | H04L 29/12009 370/395.3 |
| 2007/0022211 A1* | 1/2007 | Shimizu | H04L 61/103 709/238 |
| 2007/0220136 A1* | 9/2007 | Raghunathan | B67D 1/06 709/224 |
| 2010/0228872 A1* | 9/2010 | Diab | H04L 69/323 709/230 |
| 2010/0278530 A1* | 11/2010 | Kummetz | H04W 88/085 398/41 |
| 2011/0145434 A1* | 6/2011 | Ringen | H04L 45/00 709/238 |
| 2012/0063458 A1* | 3/2012 | Klink | G06F 9/45558 370/392 |
| 2012/0106657 A1 | 5/2012 | Fischer et al. | |
| 2012/0204253 A1* | 8/2012 | Sugimoto | H04W 36/0038 726/12 |
| 2013/0016647 A1* | 1/2013 | Marco | H04B 1/205 370/312 |
| 2014/0036758 A1* | 2/2014 | Wala | H04B 7/2606 370/312 |
| 2016/0072711 A1* | 3/2016 | Kariya | H04L 45/745 370/392 |
| 2016/0309340 A1 | 10/2016 | Malach | |
| 2017/0230871 A1* | 8/2017 | Rangaswamy | H04W 36/0033 |

* cited by examiner

SYSTEM AND METHOD FOR CONFIGURING THE ETHERNET NETWORK AND RF CONNECTIONS FOR LINKS BETWEEN NODES OF A DISTRIBUTED ANTENNA SYSTEM

CROSS-REFERENCE TO RELATED APPLICATIONS

This application claims the benefit of U.S. Provisional Application Ser. No. 62/524,648, filed Jun. 26, 2017, and titled "SYSTEM AND METHOD FOR CONFIGURING THE ETHERNET NETWORK AND RF CONNECTIONS FOR LINKS BETWEEN NODES OF A DISTRIBUTED ANTENNA SYSTEM," which is hereby incorporated herein by reference.

BACKGROUND

One way that a wireless cellular service provider can improve the coverage provided by a base station or group of base stations is by using a distributed antenna system (DAS). A DAS typically comprises one or more master units and one or more remote units that are communicatively coupled to the master units either directly or indirectly via one or more intermediary units or expansion units. One type of DAS is an analog DAS, in which DAS traffic is distributed between the master units and the remote units in analog form. Another type of DAS is a digital DAS, in which DAS traffic is distributed between the master units and the remote units in digital form.

When expansion units are initiated, the expansion units send a request for an Internet Protocol (IP) address to the master unit. Currently, each Ethernet connection between the master unit and an individual expansion unit is formed as an individual subnet. The master unit assigns IP addresses using the Dynamic Host Configuration Protocol (DHCP).

Some disadvantages for current methods relate to using DHCP. One such disadvantage is the response time when using DHCP. In particular, if response from the server is not immediate, the process continues with a timeout so it can take a long time to assign an IP address. Further, DHCP is a generic protocol for Ethernet and cannot be used to identify RF ports or configure optical connections used only for communicating RF signals.

Another disadvantage of current methods is the creation of too many subnets for the DAS network. In particular, each expansion unit is connected to a different subnet, which can result 32-64 subnets in the system. This makes routing difficult and routing tables larger. Further, another disadvantage with current methods is the inability to include multiple optical connections from an expansion unit to a master unit because there is no way to distinguish between the two ports or configure one port for RF only.

SUMMARY

Systems and methods for configuring the Ethernet network and radio frequency connections for links between nodes of a distributed antenna system are provided. In one embodiment, a system comprises a master unit having a plurality of communication ports, wherein the master unit is communicatively coupled to one or more base stations. The system further includes at least one second unit communicatively coupled to the master unit and located remotely from the master unit, wherein the at least one second unit has a first communication port communicatively coupled to one of the plurality of communication ports of the master unit via a communication medium, wherein the at least one second unit is configured to communicate Ethernet data and digitized radio frequency (RF) data with the master unit using the first communication port. The at least one second unit is configured to send a request to the master unit for an Internet Protocol (IP) address to be assigned to the at least one second unit, wherein the request includes a Media Access Control (MAC) address of the at least one second unit. The master unit is configured to determine which communication port of the plurality of communication ports of the master unit the request was received on. The master unit is further configured to assign an IP address to the at least one second unit based on which of the plurality of communication ports of the master unit the request was received on, wherein the master unit is configured to assign the IP address to the at least one second unit without using a Dynamic Host Configuration Protocol (DHCP) server. The master unit is further configured to send the IP address to the at least one second unit, wherein the at least one second unit is configured for operation using the IP address.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
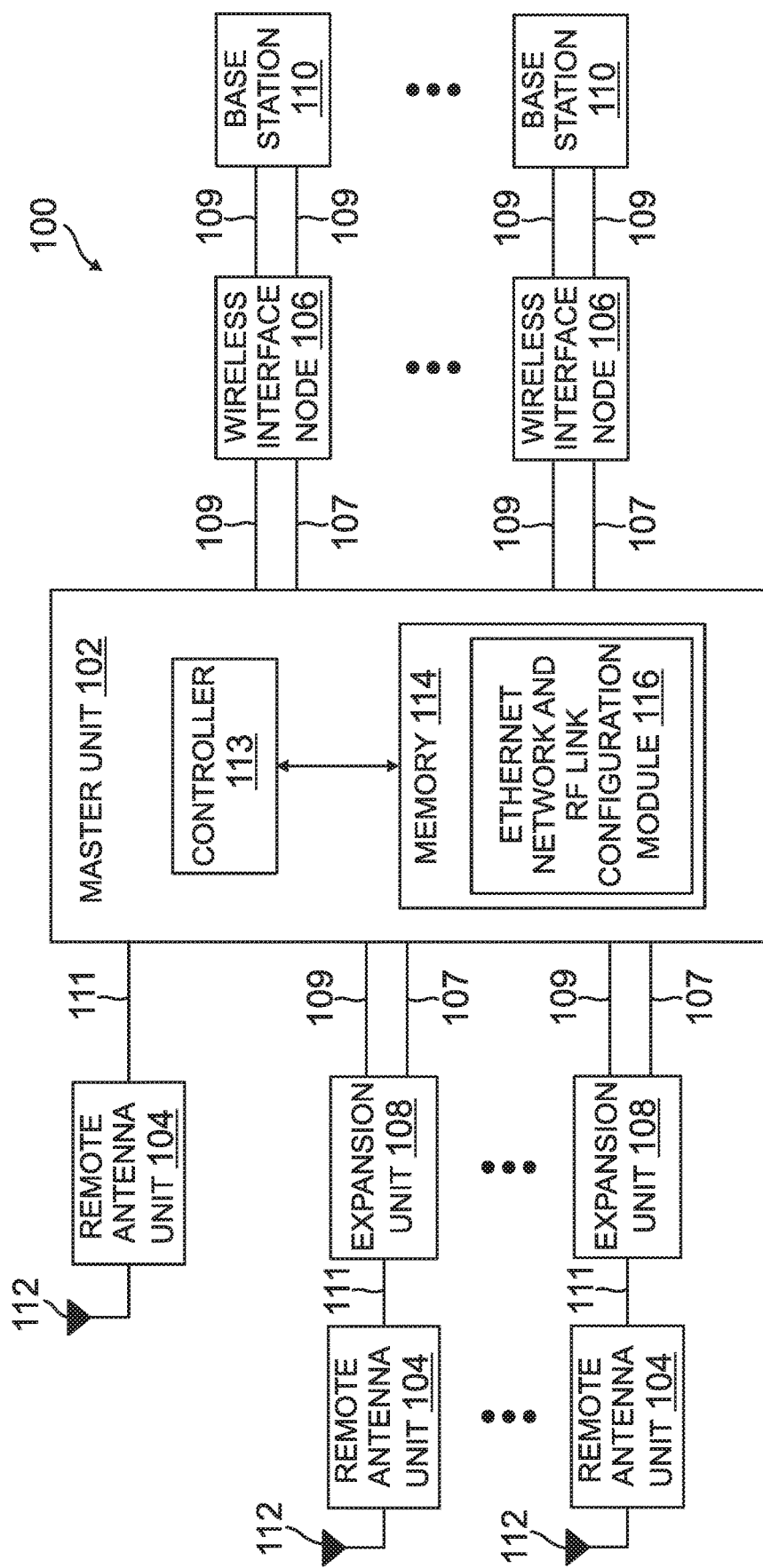
FIG. 1 is a block diagram of an example distributed antenna system according to an aspect of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below include systems and methods for configuring an Ethernet network and RF connections for links between nodes of a DAS. The DAS includes a master unit and a plurality of second nodes communicatively coupled to the master unit. The second nodes are configured to communicate Ethernet and RF signals with the master unit over a communication link. The master unit assigns IP addresses to the second nodes without using a DHCP client/server process and avoids using different subnets for each communication link. In some examples, the master unit is also able to automatically configure RF only communication links between the second nodes and the master unit.

FIG. 1 is a block diagram of an example a distributed antenna system (DAS) 100 in which the configuration scheme described herein can be implemented.

DAS 100 comprises one or more master units 102 (also referred to as "central area nodes") and one or more remote antenna units 104 that are communicatively coupled to the master units 102. In this exemplary embodiment, the DAS 100 comprises a digital DAS, in which DAS traffic is distributed between the master units 102 and the remote antenna units 104 in digital form. In other embodiments, the DAS 100 is implemented, at least in part, as an analog DAS, in which DAS traffic is distributed at least part of the way between the master units 102 and the remote antenna units 104 in analog form.

Each master unit 102 is communicatively coupled to one or more base stations 110. One or more of the base stations 110 can be co-located with the respective master unit 102 to which it is coupled (for example, where the base station 110 is dedicated to providing base station capacity to the DAS). Also, one or more of the base stations 110 can be located remotely from the respective master unit 102 to which it is coupled (for example, where the base station 110 is a macro base station providing base station capacity to a macro cell in addition to providing capacity to the DAS). In this latter case, a master unit 102 can be coupled to a donor antenna in order to wirelessly communicate with the remotely located base station 110.

The base stations 110 can be implemented as a traditional monolithic base station. Also, the base stations 110 can be implemented using a distributed base station architecture in which a base band unit (BBU) is coupled to one or more remote radio heads (RRHs), where the front haul between the BBU and the RRH uses streams of digital IQ samples. Examples of such an approach are described in the Common Public Radio Interface (CPRI) and Open Base Station Architecture Initiative (OBSAI) families of specifications.

The master units 102 can be configured to use wideband interfaces or narrowband interfaces to the base stations 110. Also, the master units 102 can be configured to interface with the base stations 110 using analog radio frequency (RF) interfaces or digital interfaces (for example, using a CPRI or OBSAI digital IQ interface). In some examples, the master units 102 interface with the base stations 110 via one or more wireless interface nodes 106. A wireless interface node 106 can be located, for example, at a base station hotel, and group a particular part of a RF installation to transfer to the master unit 102.

Traditionally, each master unit 102 interfaces with one or more base stations 110 using the analog radio frequency signals that each base station 110 communicates to and from mobile units using a suitable air interface standard. The DAS operates as a distributed repeater for such radio frequency signals. RF signals transmitted from each base station 110 (also referred to herein as "downlink RF signals") are received at one or more master units 102. Each master unit 102 uses the downlink RF signals to generate a downlink transport signal that is distributed to one or more of the remote antenna units 104. Each such remote antenna unit 104 receives the downlink transport signal and reconstructs a version of the downlink RF signals based on the downlink transport signal and causes the reconstructed downlink RF signals to be radiated from at least one antenna 112 coupled to or included in that remote antenna unit 104.

A similar process is performed in the uplink direction. RF signals transmitted from mobile units (also referred to herein as "uplink RF signals") are received at one or more remote antenna units 104. Each remote antenna unit 104 uses the uplink RF signals to generate an uplink transport signal that is transmitted from the remote antenna unit 104 to a master unit 102. Each master unit 102 receives uplink transport signals transmitted from one or more remote antenna units 104 coupled to it. The master unit 102 combines data or signals communicated via the uplink transport signals received at the master unit 102 and reconstructs a version of the uplink RF signals received at the remote antenna units 104. The master unit 102 communicates the reconstructed uplink RF signals to one or more base stations 110. In this way, the coverage of the base stations 110 can be expanded using the DAS.

As noted above, in the exemplary embodiment shown in FIG. 1, the DAS is implemented as a digital DAS. In a "digital" DAS, signals received from and provided to the base stations 110 and mobile units are used to produce digital in-phase (I) and quadrature (Q) samples, which are communicated between the master units 102 and remote antenna units 104. It is important to note that this digital IQ representation of the original signals received from the base stations 110 and from the mobile units still maintains the original modulation (that is, the change in the amplitude, phase, or frequency of a carrier) used to convey telephony or data information pursuant to the cellular air interface protocol used for wirelessly communicating between the base stations 110 and the mobile units. Examples of such cellular air interface protocols include, for example, the Global System for Mobile Communication (GSM), Universal Mobile Telecommunications System (UMTS), High-Speed Downlink Packet Access (HSDPA), and Long-Term Evolution (LTE) air interface protocols. Also, each stream of digital IQ samples represents or includes a portion of wireless spectrum. For example, the digital IQ samples can represent a single radio access network carrier (for example, a UMTS or LTE carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

In the exemplary embodiment shown in FIG. 1, one or more of the master units 102 are configured to interface with one or more base stations 110 using an analog RF interface (for example, either a traditional monolithic base station or via the analog RF interface of an RRH). The base stations 110 can be coupled to the master units 102 using a network of attenuators, combiners, splitters, amplifiers, filters, cross-connects, etc., (sometimes referred to collectively as a "point-of-interface" or "POI"). This is done so that, in the downstream, the desired set of RF carriers output by the base stations 110 can be extracted, combined, and routed to the appropriate master unit 102, and so that, in the upstream, the desired set of carriers output by the master unit 102 can be extracted, combined, and routed to the appropriate interface of each base station 110.

In the exemplary embodiment shown in FIG. 1, in the downstream, each master unit 102 can produce digital IQ samples from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by one or more base stations 110. Each portion of wireless radio frequency spectrum can include, for example, a band of wireless spectrum, a sub-band of a given band of wireless spectrum, or an individual wireless carrier.

Likewise, in the upstream, each master unit 102 can produce an upstream analog wireless signal from one or more streams of digital IQ samples received from one or more remote antenna units 104 by digitally combining streams of digital IQ samples that represent the same carriers or frequency bands or sub-bands (for example, by digitally summing such digital IQ samples), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

In the exemplary embodiment shown in FIG. 1, one or more of the master units 102 can be configured to interface with one or more base stations 110 using a digital interface (in addition to, or instead of) interfacing with one or more base stations 110 via an analog RF interface. For example, the master unit 102 can be configured to interact directly with one or more BBUs using the digital IQ interface that is used for communicating between the BBUs and an RRHs (for example, using the CPRI serial digital IQ interface).

In the downstream, each master unit 102 terminates one or more downstream streams of digital IQ samples provided to it from one or more BBUs and, if necessary, converts (by re-sampling, synchronizing, combining, separating, gain adjusting, etc.) them into downstream streams of digital IQ samples compatible with the remote antenna units 104 used in the DAS. In the upstream, each master unit 102 receives upstream streams of digital IQ samples from one or more remote antenna units 104, digitally combining streams of digital IQ samples that represent the same carriers or frequency bands or sub-bands (for example, by digitally summing such digital IQ samples), and, if necessary, converts (by re-sampling, synchronizing, combining, separating, gain adjusting, etc.) them into upstream streams of digital IQ samples compatible with the one or more BBUs that are coupled to that master unit 102.

Each master unit 102 can be implemented in other ways.

In the downstream, each remote antenna unit 104 receives streams of digital IQ samples from one or more master units 102, where each stream of digital IQ samples represents a portion of wireless radio frequency spectrum output by one or more base stations 110.

In some aspects, the master units 102 are directly coupled to the remote antenna units 104. In such aspects, the master units 102 are coupled to the remote antenna units 104 using a communication medium 111. For example, the communication medium 111 can include optical fiber or Ethernet cable complying with the Category 5, Category 5e, Category 6, Category 6A, or Category 7 specifications. Future communication medium specifications used for Ethernet signals are also within the scope of the present disclosure.

In some aspects, one or more expansion units 108 (also referred to as "intermediate units" or "transport expansion nodes") can be placed between the master units 102 and one or more of the remote antenna units 104. This can be done, for example, in order to increase the number of remote antenna units 104 that a single master unit 102 can feed, to increase the master-unit-to-remote-antenna-unit distance, and/or to reduce the amount of cabling needed to couple a master unit 102 to its associated remote antenna units 104.

The expansion units 108 are coupled to a plurality of communication ports of the master unit 102 via one or more communication links 107, 109. In exemplary embodiments, the expansion units 108 are coupled to a plurality of communication ports of the master unit 102 via one or more optical communication links. One of the communication links 107 between a respective expansion unit 108 and the master unit 102 is configured for communication of both Ethernet data and digitized RF data. In exemplary embodiments, a majority of the bandwidth of the communication link 107 configured to communicate Ethernet data and digitized RF data will be used for digitized RF data. The additional communication link(s) 109 between a respective expansion unit 108 and the master unit 102 are configured to communicate only digitized RF data.

The DHCP client/server process is not used for the assignment of IP addresses for the expansion units 108 that are coupled to the master unit 102 for DAS 100. The master unit 102 uses in-band signaling/messaging to bypass the DHCP client/server process. The IP addresses associated with the communication ports of the master unit 102 are predefined and the driver or controller 113 of the master unit 102 is responsible for the assignment of IP addresses to the expansion units 108 and the wireless interface nodes 106. For single network operation, the expansion unit 108 includes one MAC address for the right side (for network with the master unit 102). The master unit 102 includes two MAC addresses, one for the left side (for network with the expansion units 108) and one for the right side (for network with the wireless interface nodes 106).

In operation, upon startup, the MAC address of the master unit 102 is stored in a shared memory location. Since the shared memory location is volatile, the process of determining the MAC address and storing the MAC address for the master unit 102 is repeated on reboot of the master unit 102.

In operation, when each expansion unit 108 starts up, the expansion unit network is configured by a hardware monitor of the expansion unit 108. However, an IP address is assigned to the expansion unit 108 by the master unit 102. Accordingly, the expansion unit 108 sends a request to the master unit 102 for an IP address to be assigned. In exemplary embodiments, a driver of the expansion unit 108 is told, via a IOCTL call, for example, to start a worker thread that sends broadcast packets to the master unit 102. In some examples, the IOCTL call is sent via a user space program, which indicates the desired communication ports of the expansion units 108 desired for operation. In exemplary embodiments, the broadcast packets include the MAC address of the communication port of the expansion unit 108 that is configured to communicate Ethernet data and digitized RF data with the master unit 102. The broadcast packets may also include the communication port number of the expansion unit 108, a UDP port number, and/or some other information in the message body used in the assignment process. In some examples, the expansion units 108 include a reserved or unique UDP port number that identifies the message as being related to a request for an IP address. The broadcast packets can be repeated at a predetermined rate until an IP address is assigned to the expansion unit 108. In some implementations, all communication ports of an expansion unit 108 that are connected to the master unit 102 send messages to the master unit 102 upon startup. However, only the communication port configured for communicating both Ethernet data and digitized RF data requests and obtains an IP address from the master unit 102.

The master unit 102 sniffs its active communication ports for incoming packets. Rather than respective individual subnets for communication with the expansion units 108, the master unit 102 includes a single network interface with a single IP address configured to communicate with the expansion units 108. Since each communication port of the master unit 102 is essentially a separate Ethernet network, the master unit would typically call an ifconfig up to assign it an IP address and to turn it on. When a communication port has been removed (disconnected), the master unit would typically call ifconfig down to disable it. However, since all of the communication ports of the master unit 102 have the same IP address, multiple ifconfig ups cannot be called for the same IP address. In some examples, a base class of the communication port process can be created so the code can attempt to issue separate ifconfig up commands as normal. When the master unit 102 detects a communication port gets connected (plugged in communication medium), an ifconfig up is called with the base class. The base class would only allow the first instance to bring up the single network interface and the communication port. For additional requests for an ifconfig up (for other communication ports), the master unit 102 would determine that the other communication port was connected, but would not call ifconfig up to the stack. The master unit 102 can count the requests by incrementing a counter for each request. When a communication port is disconnected (communication medium removed), the master unit 102 processes an ifconfig down request and decrements the counter for each request. In other words, the counter keeps track of the active connections for Ethernet. Once the counter reaches zero after the single network interface is enabled (indicating no active connections), an ifconfig down would be called and the single network interface would be disabled.

Upon receiving an IP address request packet from an expansion unit 108, the master unit 102 determines which communication port number of the master unit 102 the request was received on and assigns an IP address to the expansion unit 108 based on that communication port number. In other words, the IP address for an expansion unit 108 is assigned based on which communication port of the master to which it is communicatively coupled. In an example, the master unit 102 includes 32 communication ports on the left side for communicating with the expansion units 108.

In some examples, the first three octets of the IP address of the master unit 102 and the communication port number of the master unit 102 are used to assign IP addresses for the expansion units 108. For example, if the IP address of the master unit 102 is "172.16.1.100" and a respective expansion unit 108 is communicatively coupled to communication port 1 of the master unit 102, the IP address for the expansion unit 108 is "172.16.1.1." In exemplary embodiments where the DAS includes multiple master units 102, a generic formula for defining the IP address of expansion units 108 could be "172.16.X.Y" where X is the master unit number and Y is the communication port of the respective master unit 102 to which the communication port of the expansion unit 108 is connected. It should be understood that the network numbers and host numbers can vary depending on the details of the particular system.

Each expansion unit 108 sniffs received packets for a response from the master unit 102 containing the matching MAC address for the communication port of that respective expansion unit 108 and IP address assigned by the master unit 102. In exemplary embodiments, the expansion unit 108 also looks for the communication port number of the expansion unit 108 and/or the UDP port number included in the request message sent by the expansion unit 108. When the expansion unit 108 receives the assigned IP address, the expansion unit 108 will configure its network with the IP address. In exemplary embodiments, the driver of the expansion unit 108 configures the network with the IP address via kernel calls or by providing the IP address to an optical monitor of the expansion unit 108 via IOCTL call to be configured by a user space application. To add the IP address via kernel calls, a kernel function, such as ARP add, could be called. In exemplary embodiments, the two least significant octets of the assigned IP address are used to identify the expansion unit 108. In exemplary embodiments, once the expansion unit 108 receives the IP address from the master unit 102, the worker thread operating to request an IP address is stopped so further requests are not sent for the IP address. The expansion unit 108 discovers its logical number in the DAS 100 based on the IP address and particularly the last octet of the IP address.

In some embodiments, at least one expansion unit 108 has two communication links with the master unit 102, where Ethernet data and digitized RF data is communicated over the first communication link 107 and only digitized RF data is communicated over the second communication link 109. In exemplary embodiments, after the expansion unit 108 configures its network with the assigned IP address, a message is sent from the expansion unit 108 to the master unit 102 over the second communication link 109 indicating that an RF only link is available. The message can include an identifier of the expansion unit 108, the communication port number of the expansion unit 108 communicatively coupled to the master unit 102 via the second communication link 109, and other information used by the master unit 102 to manage the RF connection. For example, the message could include a statement that communication port X.Y is available for RF link where X corresponds to the expansion unit number and Y corresponds to the port number of the expansion unit.

Upon receiving the message from the RF only link, the master unit 102 identifies the communication port of the master unit 102 on which the request from the RF only link was received. In exemplary embodiments, the master unit 102 also provides the communication port identifier and the information regarding the RF only link to a user space program. The user space program can be used to configure the communication links for between the master unit 102 and the expansion units 108 and/or remote antenna units 104. In exemplary embodiments, the expansion unit 108 periodically sends messages at a predetermined rate for the RF only communication link notifying the master unit 102 that the RF only communication link is still available. The master unit 102 can also detect when the RF only communication link is disconnected and stop sending RF signals to the RF only communication link.

Figure 2:
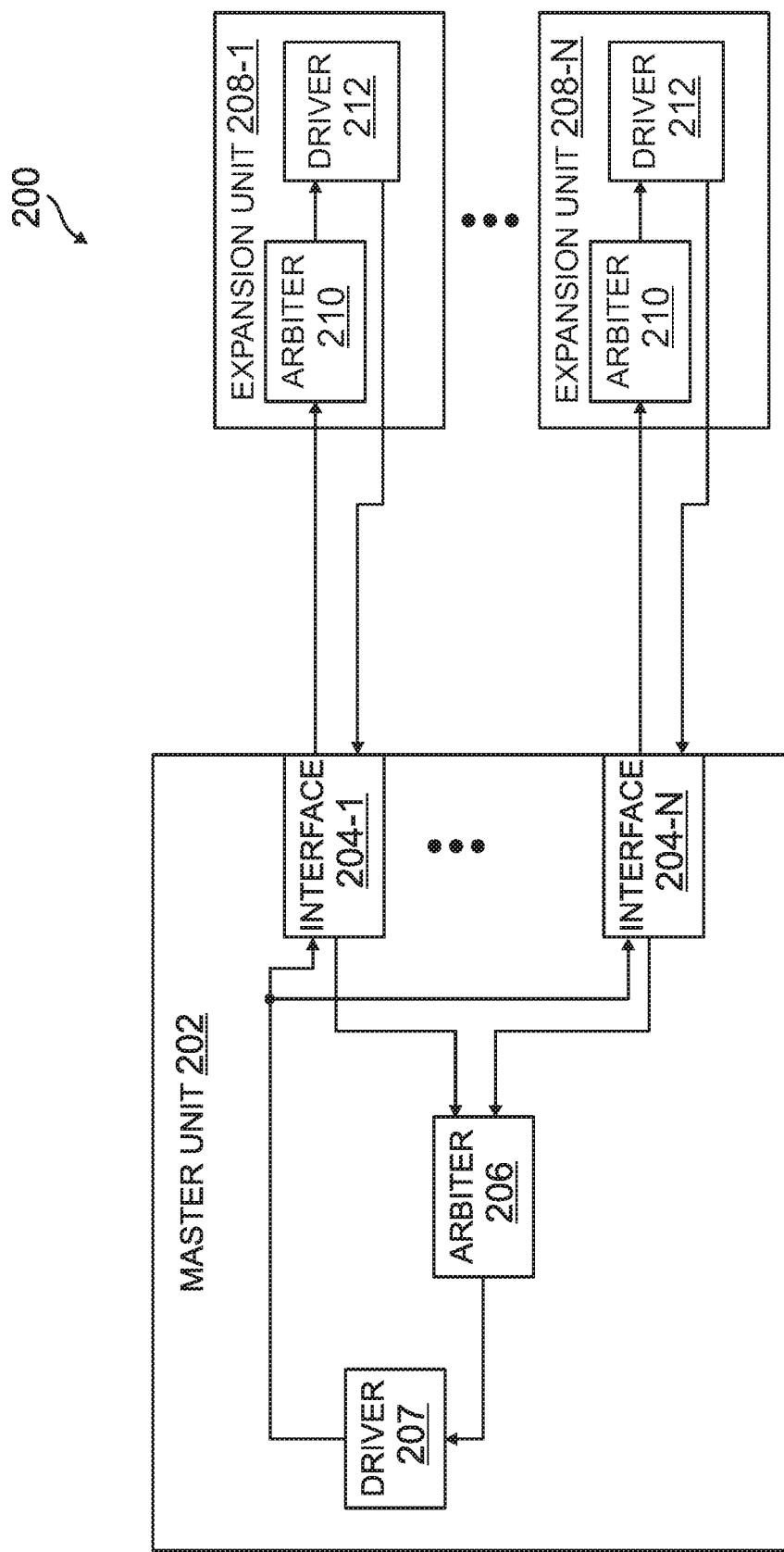
FIG. 2 is a block diagram of an example distributed antenna system according to an aspect of the present disclosure.

FIG. 2 is a block diagram of an example DAS 200 according to some aspects of the present disclosure. The functions, structures, and other description of elements for such examples described herein may apply to like named elements of DAS 200 and vice versa.

In the example shown in FIG. 2, the master unit 202 includes a respective Ethernet interface 204 for each communication port of the plurality of communication ports, which are configured to be coupled to a communication port of the expansion units 208. The drivers 212 of the expansion units 208 send a request for an IP address upon startup as discussed above with respect to FIG. 1.

The master unit 202 receives the requests at respective communication ports, which pass to a receive module or circuit of the respective Ethernet interface 204 associated with the respective communication port. The outputs from each of the receive modules or circuits of the Ethernet interfaces 204 is provided to an arbiter 206. The arbiter 206 provides the received data to the driver 207 in a single receive packet queue. In some examples, another queue is populated with the communication port number associated with the received packet that the arbiter puts into the receive packet queue. In such examples, when the driver 207 reads each packet from the receive packet queue, the driver 207 also reads the communication port number associated with the particular packet and forwards the receive packet to the appropriate network interface. Since the communication port number is provided in the second queue, the driver 207 does not perform a lookup with the MAC address of the respective Ethernet interface 204 to determine the communication port number. This reduces the overhead on the driver 207 and facilitates multiple expansion units 108 starting up and communicating at the same time.

The driver 207 of the master unit 202 assigns the IP addresses for the expansion units 208 in the manner described above with respect to FIG. 1. Once a respective IP address is assigned to a respective expansion unit 208, the driver 207 sends a broadcast message to the expansion units, which also includes the MAC address of the communication port of the respective expansion unit 208. The expansion units 208 receive the broadcast message and the respective drivers 212 of the expansion units 208 sniff the received broadcast packets for a MAC address matching the communication port of the respective expansion unit 208. If the MAC address does not match, the driver 212 drops the received broadcast packet.

Once a respective expansion unit 208 receives an IP address, the driver 212 configures the Ethernet network between the respective expansion unit 208 and the master unit 202. Further, if the respective expansion unit 208 includes any communication ports coupled to the master unit 202 and configured for RF only communication, the driver 212 sends a message to the master unit 202 over a communication link as described above with respect to FIG. 1.

While the above description focuses on describing the configuration of the Ethernet network and RF connections between expansion units 108 and the master unit 102, it should be understood that similar techniques can be used for configuring the Ethernet network and RF connections between the master unit 102 and other nodes of the DAS. For example, similar techniques can be used for configuring the Ethernet network and RF connections between the master unit 102 and wireless interface nodes 106 or remote antenna units 104 of the DAS 100.

The process for assigning IP addresses to the wireless interface nodes 106 is almost identical to that described above with respect to the expansion units 108. The primary difference is that the master unit 102 communicates with the wireless interface nodes 106 using a single network interface that is different than the network interface used for communicating with the expansion units 108. In some examples, the controller 113 of the master unit 102 also assigns the IP addresses to the wireless interface nodes 106. In exemplary embodiments, the first three octets of the IP address of the master unit 102 and the communication port number of the master unit 102 are used to assign IP addresses for the wireless interface nodes 106. For example, if the IP address of the right side interface of the master unit 102 is "172.17.1.100" and a respective wireless interface node 106 is communicatively coupled to communication port 1 of the right side of the master unit 102, the IP address for the wireless interface node is "172.17.1.1." In exemplary embodiments where the DAS includes multiple master units 102, a generic formula for defining the IP address of wireless interface nodes 106 could be "172.17.X.Y" where X is the master unit number and Y is the communication port of the respective master unit 102 to which the communication port of the wireless interface node 106 is connected. It should be understood that the network number and host numbers can vary depending on the details of the particular system. For example, 172 can be exchanged with 10 if desired.

In some examples where the master unit 102 is directly coupled to one or more remote antenna units 104, the master unit 102 may communicate with such remote antenna units 104 using the same network interface as that used to communicate with the expansion units 108. In such examples, the master unit 102 assigns IP addresses required for the remote antenna units 104 using the same methods described above with respect to the expansion units 108. In some aspects, the master unit 102 can also communicate with such remote antenna units 104 using a different network interface than that used to communicate with the expansion units 108. In such aspects, the master unit 102 assigns IP addresses required for the remote antenna units 104 using a different combination of network numbers than those used for the expansion units 108 and wireless interface nodes 106.

In various aspects, system elements, method steps, or examples described throughout this disclosure (such as the master unit, remote units, controllers, drivers, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for configuring an Ethernet network and RF communication links between nodes of a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAIVIBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 3:
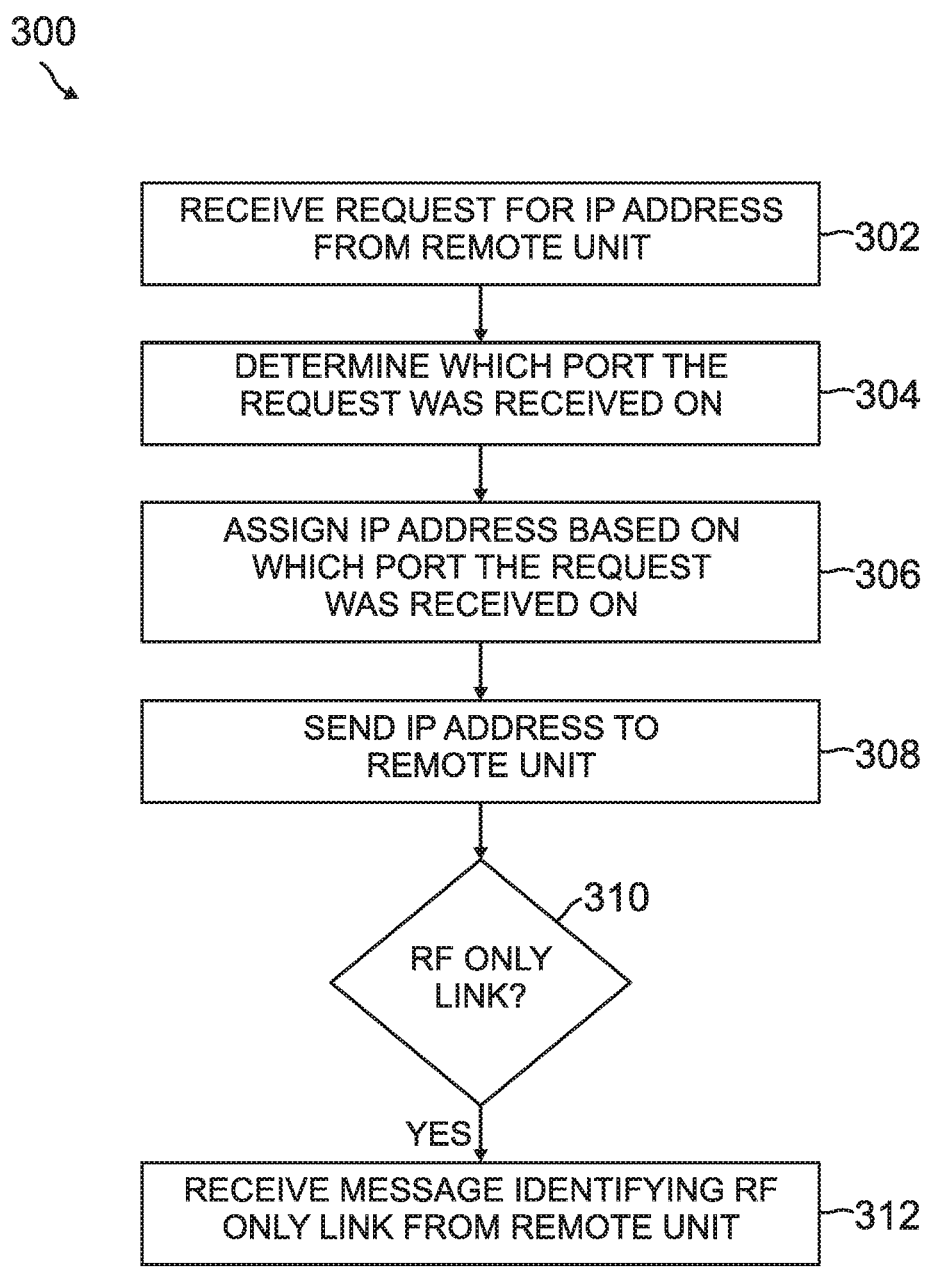
FIG. 3 is a flow chart of an example method of configuring an Ethernet network and RF connections between nodes of a distributed antenna system according to an aspect of the present disclosure.

FIG. 3 is a flow chart of an example method 300 of configuring the Ethernet network and RF connections for a link between nodes of a DAS. The functions, structures, and other description of elements for such examples described herein may apply to like named elements of method 300 and vice versa.

The method 300 begins with receiving a request for an IP address over a communication link from a remote unit (block 302). The request is received by a master unit of a distributed antenna system at one of a plurality of communication ports of the master unit. The master unit is coupled to a communication port of the remote unit via a communication medium or communication link including, for example, an optical fiber, Ethernet cable, or the like. The remote unit is configured to communicate Ethernet data and digitized RF data with the master unit over the communication medium or communication link. In some aspects, the remote unit can be an expansion unit, a wireless access node, or a remote antenna unit of the DAS. The request for an IP address may include the communication port number of the remote unit that sent the request, a UDP port number, and/or some other information in the message body.

The method 300 further includes determining which communication port of the master unit received the request from the remote unit (block 304). In some examples, the communication port number of the master unit is included in a separate queue from the queue containing the data from the request. A driver of the master unit obtains the data from both queues simultaneously, so the communication port number is associated with data from the request.

The method 300 further includes assigning an IP address to the remote unit based on which communication port of the master unit received the request (block 306). The IP address for the remote unit is assigned without using a DHCP client/server process. In some examples, the IP address assigned to the remote unit corresponds to the first three octets of the IP address of the master unit and the communication port number of the master unit which received the request from the remote unit.

The method 300 further includes sending the IP address to the remote unit (block 308). In some examples, the master unit sends the IP address to the remote unit using a broadcast message sent to all remote units coupled to the master unit, where the message includes the MAC address of the communication port of the intended remote unit. In other examples, the master unit sends the IP address to the remote unit using a unicast message. Upon receiving the IP address, the remote unit configures the Ethernet network between the remote unit and the master unit using the IP address received from the master unit. For example, a driver of the remote unit can call into Address Resolution Protocol (ARP) tables or other routines necessary to configure the Ethernet on the remote unit side.

When the remote unit includes an RF only communication link coupled to the master unit, the method 300 further includes receiving a message identifying the RF only communication link from the remote unit (block 312). In some examples, the master unit receiving the message identifies the communication port of the master unit that received the message and passes that information to a user space program.

The above described systems and method for configuring the Ethernet network and RF communication links between nodes of a DAS provide multiple benefits over current systems. For example, since the IP addresses of the various nodes are assigned by the master unit without using DHCP, the problems related to poor response time and timeouts of DHCP are avoided. The number of IP networks in use is also reduced (simplified routing and routing tables) since individual subnets are not established for each Ethernet connection. Also, the above systems and methods enable identification of RF only communication links between ports of the master unit and other nodes.

EXAMPLE EMBODIMENTS

Example 1 includes a system comprising: a master unit having a plurality of communication ports, wherein the master unit is communicatively coupled to one or more base stations; at least one second unit communicatively coupled to the master unit and located remotely from the master unit, wherein the at least one second unit has a first communication port communicatively coupled to one of the plurality of communication ports of the master unit via a communication medium, wherein the at least one second unit is configured to communicate Ethernet data and digitized radio frequency (RF) data with the master unit using the first communication port; wherein the at least one second unit is configured to send a request to the master unit for an Internet Protocol (IP) address to be assigned to the at least one second unit, wherein the request includes a Media Access Control (MAC) address of the at least one second unit; wherein the master unit is configured to determine which communication port of the plurality of communication ports of the master unit the request was received on; wherein the master unit is configured to assign an IP address to the at least one second unit based on which of the plurality of communication ports of the master unit the request was received on, wherein the master unit is configured to assign the IP address to the at least one second unit without using a Dynamic Host Configuration Protocol (DHCP) server; and wherein the master unit is configured to send the IP address to the at least one second unit, wherein the at least one second unit is configured for operation using the IP address.

Example 2 includes the system of Example 1, wherein the at least one second unit further comprises a second communication port, wherein the second communication port of the at least one second unit is communicatively coupled to one of the plurality of communication ports of the master unit via a communication medium, wherein the at least one second unit is configured to communicate only digitized RF data with the master unit using the second communication port.

Example 3 includes the system of Example 2, wherein the at least one second unit is further configured to send a message to the master unit that identifies the second communication port and indicates that the second communication port is an available RF only link.

Example 4 includes the system of any of Examples 1-3, wherein the system is a distributed antenna system, wherein the at least one second unit comprises a plurality of second units.

Example 5 includes the system of Example 4, wherein the master unit is configured to communicate with the plurality of second units using a single network interface.

Example 6 includes the system of Example 5, wherein the master unit is configured to: enable the single network interface upon detection of a first connection between the master unit and one of the plurality of second units; and increment a counter for each new detected connection between the master unit and the plurality of second units.

Example 7 includes the system of Example 6, wherein the master unit is further configured to: decrement the counter for each disconnected connection between the master unit and the plurality of second units; and disable the single network interface when the counter indicates that there is no connection between the master unit and the plurality of second units.

Example 8 includes the system of any of Examples 4-7, wherein each of the plurality of second units is configured to send a respective request for an IP address, wherein each respective request for an IP address includes a MAC address for a respective first communication port of the respective second unit of the plurality of second units; wherein the master unit is configured to determine which of the plurality of communication ports of the master unit each respective request was received on; wherein the master unit is configured to assign a respective IP address to each of the plurality of second units based on which of the plurality of communication ports of the master unit the respective request was received on, wherein the master unit is configured to assign the respective IP address to each of the plurality of second units without using a Dynamic Host Configuration Protocol (DHCP) server; and wherein the master unit is configured to send the respective IP address to the respective second unit of the plurality of second units, wherein the respective second unit is configured using the respective IP address.

Example 9 includes the system of Example 8, wherein the master unit is configured to send each respective IP address to the respective second unit of the plurality of second units using a broadcast message, wherein the broadcast message includes the respective MAC address of the respective first communication port of the respective second unit.

Example 10 includes the system of any of Examples 1-9, wherein the at least one second unit comprises an expansion unit, a remote antenna unit, or a wireless interface node of the system.

Example 11 includes the system of any of Examples 1-10, wherein the at least one second unit comprises an expansion unit, wherein the expansion unit is communicatively coupled to at least one remote antenna unit.

Example 12 includes the system of Example 11, wherein the expansion unit is communicatively coupled to the master unit via an optical communication medium.

Example 13 includes the system of any of Examples 1-12, wherein the master unit is configured to assign the IP address based on an IP address of a common network interface of the master unit.

Example 14 includes the system of any of Examples 1-13, wherein the at least one second unit comprises an extension unit or a remote antenna unit; wherein the master unit includes a second plurality of communication ports, wherein the master unit is communicatively coupled to the one or more base stations via at least one wireless interface node, wherein the at least one wireless interface node is located remotely from the master unit and has a first communication port communicatively coupled to one of the second plurality of communication ports of the master unit via a communication medium, wherein the at least one wireless interface node is configured to communicate Ethernet data and digitized radio frequency (RF) data with the master unit using the first communication port; wherein the at least one wireless interface node is configured to send a request to the master unit for an Internet Protocol (IP) address to be assigned to the at least one wireless interface node, wherein the request includes a Media Access Control (MAC) address of the at least one wireless interface node; wherein the master unit is configured to determine which communication port of the second plurality of communication ports of the master unit the request was received on; wherein the master unit is configured to assign an IP address to the at least one wireless interface node based on which communication port of the second plurality of communication ports of the master unit the request was received on, wherein the master unit is configured to assign the IP address to the at least one wireless interface node without using a Dynamic Host Configuration Protocol (DHCP) server; and wherein the master unit is configured to send the IP address to the at least one wireless interface node, wherein the at least one wireless interface node is configured using the IP address.

Example 15 includes a master unit of a distributed antenna system, comprising: a controller; a first plurality of communication ports, wherein each of the first plurality of communication ports is configured to be coupled to a communication port of a second unit located remotely from the master unit via a communication medium, wherein at least one second unit is configured to communicate Ethernet data and digitized radio frequency (RF) data with the master unit using a first communication port; wherein the master unit is configured to receive a request for an Internet Protocol (IP) address to be assigned to the at least one second unit, wherein the request includes a Media Access Control (MAC) address of the at least one second unit; wherein the master unit is configured to determine which communication port of the plurality of communication ports of the master unit the request was received on; wherein the master unit is configured to assign an IP address to the at least one second unit based on which of the plurality of communication ports of the master unit the request was received on, wherein the master unit is configured to assign the IP address to the at least one second unit without using a Dynamic Host Configuration Protocol (DHCP) server; and wherein the master unit is configured to send the IP address to the at least one second unit, wherein the at least one second unit is configured using the IP address.

Example 16 includes the master unit of Example 15, wherein the at least one second unit further comprises a second communication port, wherein the second communication port of the at least one second unit is communicatively coupled to the master unit via a communication medium, wherein the at least one second unit is configured to communicate only digitized RF data with the master unit using the second communication port, wherein the master unit is configured to receive a message from the at least one second unit that identifies the second communication port and indicates that the second communication port is an available RF only link.

Example 17 includes the master unit of any of Examples 15-16, wherein the at least one second unit comprises a plurality of second units.

Example 18 includes the master unit of Example 17, wherein the master unit is configured to communicate with the plurality of second units using a single network interface.

Example 19 includes the master unit of Example 18, wherein the master unit is further configured to: enable the single network interface upon detection of a first connection between the master unit and one of the plurality of second units; and increment a counter for each new detected connection between the master unit and the plurality of second units.

Example 20 includes the master unit of Example 19, wherein the master unit is further configured to: decrement the counter for each disconnected connection between the master unit and the plurality of second units; and disable the single network interface when the counter indicates that there is no connection between the master unit and the plurality of second units.

Example 21 includes the master unit of any of Examples 18-20, wherein each of the plurality of second units is configured to send a respective request for an IP address, wherein each respective request for an IP address includes a MAC address of a first communication port of the respective second unit of the plurality of second units; wherein the master unit is configured to determine which communication port of the plurality of communication ports of the master unit each respective request was received on; wherein the master unit is configured to assign a respective IP address to each of the plurality of second units based on which of the plurality of communication ports of the master unit the respective request was received on, wherein the master unit is configured to assign the respective IP address to each of the plurality of second units without using a Dynamic Host Configuration Protocol (DHCP) server; and wherein the master unit is configured to send the respective IP address to the respective second unit of the plurality of second units, wherein the respective second unit is configured using the respective IP address.

Example 22 includes the master unit of Example 21, wherein the master unit is configured to send each respective IP address to the respective second unit of the plurality of second units using a broadcast message, wherein the broadcast message includes the respective MAC address of the respective first communication port of the respective second unit.

Example 23 includes the master unit of any of Examples 15-22, wherein the at least one second unit comprises an expansion unit, a remote antenna unit, or a wireless interface node.

Example 24 includes the master unit of any of Examples 15-23, wherein the at least one second unit comprises an expansion unit, wherein the expansion unit is communicatively coupled to at least one remote antenna unit.

Example 25 includes the master unit of Example 24, wherein the expansion unit is communicatively coupled to the master unit via an optical communication medium.

Example 26 includes the master unit of Examples 15-24, wherein the at least one second unit comprises an extension unit or a remote antenna unit; wherein the master unit includes a second plurality of communication ports, wherein the master unit is communicatively coupled to the one or more base stations via at least one wireless interface node, wherein the at least one wireless interface node is located remotely from the master unit and has a first communication port communicatively coupled to the second plurality of communication ports of the master unit via a communication medium, wherein the at least one wireless interface node is configured to communicate Ethernet data and digitized radio frequency (RF) data with the master unit using the first communication port; wherein the at least one wireless interface node is configured to send a request to the master unit for an Internet Protocol (IP) address to be assigned to the at least one wireless interface node, wherein the request includes a Media Access Control (MAC) address of the at least one wireless interface node; wherein the master unit is configured to determine which communication port of the second plurality of communication ports of the master unit the request was received on; wherein the master unit is configured to assign an IP address to the at least one wireless interface node based on which communication port of the second plurality of communication ports of the master unit the request was received on, wherein the master unit is configured to assign the IP address to the at least one wireless interface node without using a Dynamic Host Configuration Protocol (DHCP) server; and wherein the master unit is configured to send the IP address to the at least one wireless interface node, wherein the at least one wireless interface node is configured using the IP address.

Example 27 includes the master unit of any of Examples 15-26, wherein the master unit is further configured to assign the IP address based on an IP address of the master unit.

Example 28 includes a remote unit of a distributed antenna system, comprising: a first communication port configured to be coupled to a first communication port of a plurality of communication ports of a master unit via a first communication medium, wherein the remote unit is located remotely from the master unit, wherein the remote unit is configured to communicate Ethernet data and digitized radio frequency (RF) data with the master unit using the first communication port; wherein the remote unit is configured to send a request to the master unit for an Internet Protocol (IP) address to be assigned to the remote unit, wherein the request includes a Media Access Control (MAC) address of the remote unit and is received at the first communication port of the plurality of communication ports of the master unit; wherein the master unit is configured to determine an identifier of the first communication port of the plurality of communication ports of the master unit; wherein the master unit is configured to assign an IP address to the remote unit based on the identifier from the first communication port of the plurality of communication ports of the master unit, wherein the master unit is configured to assign the IP address to the remote unit without using a Dynamic Host Configuration Protocol (DHCP) server; and wherein the remote unit is configured to receive the IP address from the master unit, wherein the remote unit is configured using the IP address.

Example 29 includes the remote unit of Example 28, wherein the remote unit further comprises a second communication port, wherein the second communication port of the remote unit is communicatively coupled to a second communication port of the plurality of communication ports of the master unit via a second communication medium, wherein the remote unit is configured to communicate only digitized RF data with the master unit using the second communication port, wherein the remote unit is configured to send a message to the master unit that identifies the second communication port and indicates that the second communication port is an available RF only link.

Example 30 includes the remote unit of any of Examples 28-29, wherein the remote unit comprises an expansion unit, a remote antenna unit, or a wireless interface node.

Example 31 includes the remote unit of any of Examples 28-30, wherein the remote unit comprises an expansion unit, wherein the expansion unit is communicatively coupled to at least one remote antenna unit.

Example 32 includes the remote unit of Example 31, wherein the expansion unit is communicatively coupled to the master unit via an optical communication medium.

Example 33 includes the remote unit of any of Examples 28-32, wherein the master unit is further configured to assign the IP address based on an IP address of the master unit.

Example 34 includes a method of configuring an Ethernet network and RF links between a master unit and at least one second unit of a distributed antenna system, wherein the master unit is communicatively coupled to one or more base stations, wherein the at least one second unit is communicatively coupled to the master unit and located remotely from the master unit, wherein the master unit comprises a plurality of communication ports, wherein the at least one second unit has a first communication port communicatively coupled to one of the plurality of communication ports of the master unit via a communication medium, wherein the at least one second unit is configured to communicate Ethernet data and digitized radio frequency (RF) data with the master unit using the first communication port, the method comprising: receiving, at one of the plurality of communication ports of the master unit, a request for an Internet Protocol (IP) address to be assigned to at least one second unit, wherein the request includes a Media Access Control (MAC) address of the at least one second unit; determining which communication port of the plurality of communication ports of the master unit the request was received on; assigning an IP address to the at least one second unit based on which communication port of the plurality of communication ports of the master unit the request was received on, wherein the IP address is assigned to the at least one second unit without using a Dynamic Host Configuration Protocol (DHCP) server; and sending the IP address to the at least one second unit, wherein the at least one second unit is configured for operation using the IP address.

Example 35 includes the method of Example 34, wherein the at least one second unit further comprises a second communication port, wherein the second communication port of the at least one second unit is communicatively coupled to the master unit via a communication medium, wherein the at least one second unit is configured to communicate only digitized RF data with the master unit using the second communication port.

Example 36 includes the method of Example 35, further comprising: receiving, at one of the plurality of communication ports of the master unit, a message that identifies the second communication port and indicates that the second communication port is an available RF only link; determining which communication port of the master unit on which the request from the RF only link was received; and providing a communication port identifier and information regarding the RF only link to a user space program.

Example 37 includes the method of any of Examples 34-36, wherein the at least one second unit comprises a plurality of second units.

Example 38 includes the method of Example 37, wherein the master unit communicates with the plurality of second units using a single network interface.

Example 39 includes the method of Example 38, further comprising: enabling the single network interface upon detection of a first connection between the master unit and one of the plurality of second units; and incrementing a counter for each new detected connection between the master unit and the plurality of second units.

Example 40 includes the method of Example 39, further comprising: decrementing the counter for each disconnected connection between the master unit and the plurality of second units; and disabling the single network interface when the counter indicates that there is no connection between the master unit and the plurality of second units.

Example 41 includes the method of any of Examples 37-40, further comprising: receiving a respective request for an IP address from each of the plurality of second units, wherein each respective request for an IP address includes a MAC address of a respective first communication port of the respective second unit of the plurality of second units; determine which of the plurality of communication ports of the master unit each respective request was received on; assigning a respective IP address to each of the plurality of second units based on which of the plurality of communication ports of the master unit the respective request was received on, wherein the respective IP address are assigned to each of the plurality of second units without using a Dynamic Host Configuration Protocol (DHCP) server; and sending each respective IP address to the respective second unit of the plurality of second units, wherein the respective second unit is configured using the respective IP address.

Example 42 includes the method of Example 41, wherein sending each respective IP address to the respective second unit of the plurality of second units comprising using a broadcast message, wherein each broadcast message includes the respective MAC address of the respective first communication port of the respective second unit.

Example 43 includes the method of any of Examples 34-42, wherein the at least one second unit comprises an expansion unit, a remote antenna unit, or a wireless interface node.

Example 44 includes the method of any of Examples 34-43, wherein the at least one second unit comprises an expansion unit, wherein the expansion unit is communicatively coupled to at least one remote antenna unit.

Example 45 includes the method of Example 44, wherein the expansion unit is communicatively coupled to the master unit via an optical communication medium.

Example 46 includes the method of any of Examples 34-45, wherein assigning an IP address to the at least one second unit based on which communication port of the plurality of communication ports of the master unit the request was received on comprises assigning the IP address based on an IP address of the master unit.

Example 47 includes the method of any of Examples 34-46, wherein the at least one second unit comprises an extension unit or a remote antenna unit; wherein the master unit includes a second plurality of communication ports, wherein the master unit is communicatively coupled to the one or more base stations via at least one wireless interface node, wherein the at least one wireless interface node is located remotely from the master unit and has a first communication port communicatively coupled to one of the second plurality of communication ports of the master unit via a communication medium, wherein the at least one wireless interface node is configured to communicate Ethernet data and digitized radio frequency (RF) data with the master unit using the first communication port, the method further comprising: receiving, at one of the second plurality of communication ports of the master unit, a request for an Internet Protocol (IP) address to be assigned to the at least one wireless interface node, wherein the request includes a Media Access Control (MAC) address of the at least one wireless interface node; determining which communication port of the second plurality of communication ports of the master unit the request was received on; assigning an IP address to the at least one wireless interface node based on which communication port of the second plurality of communication ports of the master unit the request was received on, wherein the IP address is assigned to the at least one wireless interface node without using a Dynamic Host Configuration Protocol (DHCP) server; and sending the IP address to the at least one wireless interface node, wherein the at least one wireless interface node is configured using the IP address.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
a master unit having a plurality of communication ports, wherein the master unit is communicatively coupled to one or more base stations;
at least one second unit communicatively coupled to the master unit and located remotely from the master unit, wherein the at least one second unit has a first communication port communicatively coupled to one of the plurality of communication ports of the master unit via a communication medium, wherein the at least one second unit is configured to communicate Ethernet data and digitized radio frequency (RF) data with the master unit using the first communication port;
wherein the at least one second unit is configured to send a request to the master unit for an Internet Protocol (IP) address to be assigned to the at least one second unit, wherein the request includes a Media Access Control (MAC) address of the at least one second unit;
wherein the master unit is configured to determine which communication port of the plurality of communication ports of the master unit the request was received on;
wherein the master unit is configured to assign an IP address to the at least one second unit based on which of the plurality of communication ports of the master unit the request was received on, wherein the master unit is configured to assign the IP address to the at least one second unit without using a Dynamic Host Configuration Protocol (DHCP) server; and
wherein the master unit is configured to send the IP address to the at least one second unit, wherein the at least one second unit is configured for operation using the IP address.

2. The system of claim 1, wherein the at least one second unit further comprises a second communication port, wherein the second communication port of the at least one second unit is communicatively coupled to one of the plurality of communication ports of the master unit via a communication medium, wherein the at least one second unit is configured to communicate only digitized RF data with the master unit using the second communication port.

3. The system of claim 2, wherein the at least one second unit is further configured to send a message to the master unit that identifies the second communication port and indicates that the second communication port is an available RF only link.

4. The system of claim 1, wherein the system is a distributed antenna system that comprises a plurality of second units.

5. The system of claim 4, wherein the master unit is configured to communicate with the plurality of second units using a single network interface.

6. The system of claim 5, wherein the master unit is configured to:
enable the single network interface upon detection of a first connection between the master unit and one of the plurality of second units; and
increment a counter for each new detected connection between the master unit and the plurality of second units.

7. The system of claim 6, wherein the master unit is further configured to:
decrement the counter for each disconnected connection between the master unit and the plurality of second units; and
disable the single network interface when the counter indicates that there is no connection between the master unit and the plurality of second units.

8. The system of claim 4, wherein each of the plurality of second units is configured to send a respective request for an IP address, wherein each respective request for an IP address includes a MAC address for a respective first communication port of the respective second unit of the plurality of second units;
wherein the master unit is configured to determine which of the plurality of communication ports of the master unit each respective request was received on;
wherein the master unit is configured to assign a respective IP address to each of the plurality of second units based on which of the plurality of communication ports of the master unit the respective request was received on, wherein the master unit is configured to assign the respective IP address to each of the plurality of second units without using a Dynamic Host Configuration Protocol (DHCP) server; and
wherein the master unit is configured to send the respective IP address to the respective second unit of the plurality of second units, wherein the respective second unit is configured using the respective IP address.

9. The system of claim 8, wherein the master unit is configured to send each respective IP address to the respective second unit of the plurality of second units using a broadcast message, wherein the broadcast message includes the respective MAC address of the respective first communication port of the respective second unit.

10. The system of claim 1, wherein the at least one second unit comprises an expansion unit, a remote antenna unit, or a wireless interface node of the system.

11. The system of claim 1, wherein the at least one second unit comprises an expansion unit, wherein the expansion unit is communicatively coupled to at least one remote antenna unit.

12. The system of claim 11, wherein the expansion unit is communicatively coupled to the master unit via an optical communication medium.

13. The system of claim 1, wherein the master unit is configured to assign the IP address based on an IP address of a common network interface of the master unit.

14. The system of claim 1, wherein the at least one second unit comprises an expansion unit or a remote antenna unit;
wherein the master unit includes a second plurality of communication ports, wherein the master unit is communicatively coupled to the one or more base stations via at least one wireless interface node, wherein the at least one wireless interface node is located remotely from the master unit and has a first communication port communicatively coupled to one of the second plurality of communication ports of the master unit via a communication medium, wherein the at least one wireless interface node is configured to communicate Ethernet data and digitized radio frequency (RF) data with the master unit using the first communication port;
wherein the at least one wireless interface node is configured to send a request to the master unit for an Internet Protocol (IP) address to be assigned to the at least one wireless interface node, wherein the request includes a Media Access Control (MAC) address of the at least one wireless interface node;
wherein the master unit is configured to determine which communication port of the second plurality of communication ports of the master unit the request was received on;

wherein the master unit is configured to assign an IP address to the at least one wireless interface node based on which communication port of the second plurality of communication ports of the master unit the request was received on, wherein the master unit is configured to assign the IP address to the at least one wireless interface node without using a Dynamic Host Configuration Protocol (DHCP) server; and wherein the master unit is configured to send the IP address to the at least one wireless interface node, wherein the at least one wireless interface node is configured using the IP address.

15. A master unit of a distributed antenna system, comprising:
a controller;
a first plurality of communication ports, wherein each of the first plurality of communication ports is configured to be coupled to a communication port of a second unit located remotely from the master unit via a communication medium, wherein at least one second unit is configured to communicate Ethernet data and digitized radio frequency (RF) data with the master unit using a first communication port;
wherein the master unit is configured to receive a request for an Internet Protocol (IP) address to be assigned to the at least one second unit, wherein the request includes a Media Access Control (MAC) address of the at least one second unit;
wherein the master unit is configured to determine which communication port of the plurality of communication ports of the master unit the request was received on;
wherein the master unit is configured to assign an IP address to the at least one second unit based on which of the plurality of communication ports of the master unit the request was received on, wherein the master unit is configured to assign the IP address to the at least one second unit without using a Dynamic Host Configuration Protocol (DHCP) server; and
wherein the master unit is configured to send the IP address to the at least one second unit, wherein the at least one second unit is configured using the IP address.

16. The master unit of claim 15, wherein the at least one second unit further comprises a second communication port, wherein the second communication port of the at least one second unit is communicatively coupled to the master unit via a communication medium, wherein the at least one second unit is configured to communicate only digitized RF data with the master unit using the second communication port,
wherein the master unit is configured to receive a message from the at least one second unit that identifies the second communication port and indicates that the second communication port is an available RF only link.

17. The master unit of claim 15, wherein the distributed antenna system comprises a plurality of second units.

18. The master unit of claim 17, wherein the master unit is configured to communicate with the plurality of second units using a single network interface.

19. The master unit of claim 18, wherein the master unit is further configured to:
enable the single network interface upon detection of a first connection between the master unit and one of the plurality of second units; and
increment a counter for each new detected connection between the master unit and the plurality of second units.

20. The master unit of claim 19, wherein the master unit is further configured to:
decrement the counter for each disconnected connection between the master unit and the plurality of second units; and
disable the single network interface when the counter indicates that there is no connection between the master unit and the plurality of second units.

21. The master unit of claim 18, wherein each of the plurality of second units is configured to send a respective request for an IP address, wherein each respective request for an IP address includes a MAC address of a first communication port of the respective second unit of the plurality of second units;
wherein the master unit is configured to determine which communication port of the plurality of communication ports of the master unit each respective request was received on;
wherein the master unit is configured to assign a respective IP address to each of the plurality of second units based on which of the plurality of communication ports of the master unit the respective request was received on, wherein the master unit is configured to assign the respective IP address to each of the plurality of second units without using a Dynamic Host Configuration Protocol (DHCP) server; and
wherein the master unit is configured to send the respective IP address to the respective second unit of the plurality of second units, wherein the respective second unit is configured using the respective IP address.

22. The master unit of claim 21, wherein the master unit is configured to send each respective IP address to the respective second unit of the plurality of second units using a broadcast message, wherein the broadcast message includes the respective MAC address of the respective first communication port of the respective second unit.

23. The master unit of claim 15, wherein the at least one second unit comprises an expansion unit, a remote antenna unit, or a wireless interface node.

24. The master unit of claim 15, wherein the at least one second unit comprises an expansion unit, wherein the expansion unit is communicatively coupled to at least one remote antenna unit.

25. The master unit of claim 24, wherein the expansion unit is communicatively coupled to the master unit via an optical communication medium.

26. The master unit of claim 15, wherein the at least one second unit comprises an expansion unit or a remote antenna unit;
wherein the master unit includes a second plurality of communication ports, wherein the master unit is communicatively coupled to the one or more base stations via at least one wireless interface node, wherein the at least one wireless interface node is located remotely from the master unit and has a first communication port communicatively coupled to the second plurality of communication ports of the master unit via a communication medium, wherein the at least one wireless interface node is configured to communicate Ethernet data and digitized radio frequency (RF) data with the master unit using the first communication port;
wherein the at least one wireless interface node is configured to send a request to the master unit for an Internet Protocol (IP) address to be assigned to the at least one wireless interface node, wherein the request includes a Media Access Control (MAC) address of the at least one wireless interface node;

wherein the master unit is configured to determine which communication port of the second plurality of communication ports of the master unit the request was received on;

wherein the master unit is configured to assign an IP address to the at least one wireless interface node based on which communication port of the second plurality of communication ports of the master unit the request was received on, wherein the master unit is configured to assign the IP address to the at least one wireless interface node without using a Dynamic Host Configuration Protocol (DHCP) server; and wherein the master unit is configured to send the IP address to the at least one wireless interface node, wherein the at least one wireless interface node is configured using the IP address.

27. The master unit of claim 15, wherein the master unit is further configured to assign the IP address based on an IP address of the master unit.

28. A remote unit of a distributed antenna system, comprising:

a first communication port configured to be coupled to a first communication port of a plurality of communication ports of a master unit via a first communication medium, wherein the remote unit is located remotely from the master unit, wherein the remote unit is configured to communicate Ethernet data and digitized radio frequency (RF) data with the master unit using the first communication port;

wherein the remote unit is configured to send a request to the master unit for an Internet Protocol (IP) address to be assigned to the remote unit, wherein the request includes a Media Access Control (MAC) address of the remote unit and is received at the first communication port of the plurality of communication ports of the master unit;

wherein the master unit is configured to determine an identifier of the first communication port of the plurality of communication ports of the master unit;

wherein the master unit is configured to assign an IP address to the remote unit based on the identifier from the first communication port of the plurality of communication ports of the master unit, wherein the master unit is configured to assign the IP address to the remote unit without using a Dynamic Host Configuration Protocol (DHCP) server; and wherein the remote unit is configured to receive the IP address from the master unit, wherein the remote unit is configured using the IP address.

29. The remote unit of claim 28, wherein the remote unit further comprises a second communication port, wherein the second communication port of the remote unit is communicatively coupled to a second communication port of the plurality of communication ports of the master unit via a second communication medium, wherein the remote unit is configured to communicate only digitized RF data with the master unit using the second communication port, wherein the remote unit is configured to send a message to the master unit that identifies the second communication port and indicates that the second communication port is an available RF only link.

30. The remote unit of claim 28, wherein the remote unit comprises an expansion unit, a remote antenna unit, or a wireless interface node.

31. The remote unit of claim 28, wherein the remote unit comprises an expansion unit, wherein the expansion unit is communicatively coupled to at least one remote antenna unit.

32. The remote unit of claim 31, wherein the expansion unit is communicatively coupled to the master unit via an optical communication medium.

33. The remote unit of claim 28, wherein the master unit is further configured to assign the IP address based on an IP address of the master unit.

34. A method of configuring an Ethernet network and RF links between a master unit and at least one second unit of a distributed antenna system, wherein the master unit is communicatively coupled to one or more base stations, wherein the at least one second unit is communicatively coupled to the master unit and located remotely from the master unit, wherein the master unit comprises a plurality of communication ports, wherein the at least one second unit has a first communication port communicatively coupled to one of the plurality of communication ports of the master unit via a communication medium, wherein the at least one second unit is configured to communicate Ethernet data and digitized radio frequency (RF) data with the master unit using the first communication port, the method comprising:

receiving, at one of the plurality of communication ports of the master unit, a request for an Internet Protocol (IP) address to be assigned to at least one second unit, wherein the request includes a Media Access Control (MAC) address of the at least one second unit;

determining which communication port of the plurality of communication ports of the master unit the request was received on;

assigning an IP address to the at least one second unit based on which communication port of the plurality of communication ports of the master unit the request was received on, wherein the IP address is assigned to the at least one second unit without using a Dynamic Host Configuration Protocol (DHCP) server; and sending the IP address to the at least one second unit, wherein the at least one second unit is configured for operation using the IP address.

35. The method of claim 34, wherein the at least one second unit further comprises a second communication port, wherein the second communication port of the at least one second unit is communicatively coupled to the master unit via a communication medium, wherein the at least one second unit is configured to communicate only digitized RF data with the master unit using the second communication port.

36. The method of claim 35, further comprising:

receiving, at one of the plurality of communication ports of the master unit, a message that identifies the second communication port and indicates that the second communication port is an available RF only link;

determining which communication port of the master unit on which the request from the RF only link was received; and providing a communication port identifier and information regarding the RF only link to a user space program.

37. The method of claim 34, wherein the distributed antenna system comprises a plurality of second units.

38. The method of claim 37, wherein the master unit communicates with the plurality of second units using a single network interface.

39. The method of claim 38, further comprising:
enabling the single network interface upon detection of a first connection between the master unit and one of the plurality of second units; and
incrementing a counter for each new detected connection between the master unit and the plurality of second units.

40. The method of claim 39, further comprising:
decrementing the counter for each disconnected connection between the master unit and the plurality of second units; and
disabling the single network interface when the counter indicates that there is no connection between the master unit and the plurality of second units.

41. The method of claim 37, further comprising:
receiving a respective request for an IP address from each of the plurality of second units, wherein each respective request for an IP address includes a MAC address of a respective first communication port of the respective second unit of the plurality of second units;
determine which of the plurality of communication ports of the master unit each respective request was received on;
assigning a respective IP address to each of the plurality of second units based on which of the plurality of communication ports of the master unit the respective request was received on, wherein the respective IP address are assigned to each of the plurality of second units without using a Dynamic Host Configuration Protocol (DHCP) server; and
sending each respective IP address to the respective second unit of the plurality of second units, wherein the respective second unit is configured using the respective IP address.

42. The method of claim 41, wherein sending each respective IP address to the respective second unit of the plurality of second units comprises using at least one broadcast message, wherein each broadcast message includes the respective MAC address of the respective first communication port of the respective second unit.

43. The method of claim 34, wherein the at least one second unit comprises an expansion unit, a remote antenna unit, or a wireless interface node.

44. The method of claim 34, wherein the at least one second unit comprises an expansion unit, wherein the expansion unit is communicatively coupled to at least one remote antenna unit.

45. The method of claim 44, wherein the expansion unit is communicatively coupled to the master unit via an optical communication medium.

46. The method of claim 34, wherein assigning an IP address to the at least one second unit based on which communication port of the plurality of communication ports of the master unit the request was received on comprises assigning the IP address based on an IP address of the master unit.

47. The method of claim 34, wherein the at least one second unit comprises an expansion unit or a remote antenna unit;
wherein the master unit includes a second plurality of communication ports, wherein the master unit is communicatively coupled to the one or more base stations via at least one wireless interface node, wherein the at least one wireless interface node is located remotely from the master unit and has a first communication port communicatively coupled to one of the second plurality of communication ports of the master unit via a communication medium, wherein the at least one wireless interface node is configured to communicate Ethernet data and digitized radio frequency (RF) data with the master unit using the first communication port, the method further comprising:
receiving, at one of the second plurality of communication ports of the master unit, a request for an Internet Protocol (IP) address to be assigned to the at least one wireless interface node, wherein the request includes a Media Access Control (MAC) address of the at least one wireless interface node;
determining which communication port of the second plurality of communication ports of the master unit the request was received on;
assigning an IP address to the at least one wireless interface node based on which communication port of the second plurality of communication ports of the master unit the request was received on, wherein the IP address is assigned to the at least one wireless interface node without using a Dynamic Host Configuration Protocol (DHCP) server; and
sending the IP address to the at least one wireless interface node, wherein the at least one wireless interface node is configured using the IP address.

* * * * *